US011016890B2

(12) United States Patent
Stonelake et al.

(10) Patent No.: US 11,016,890 B2
(45) Date of Patent: May 25, 2021

(54) CPU CACHE FLUSHING TO PERSISTENT MEMORY

(71) Applicant: Micron Technology, Inc., Boise, ID (US)

(72) Inventors: Paul Stonelake, San Jose, CA (US); Samir Mittal, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 177 days.

(21) Appl. No.: 16/167,189

(22) Filed: Oct. 22, 2018

(65) Prior Publication Data

US 2019/0243759 A1 Aug. 8, 2019

Related U.S. Application Data

(60) Provisional application No. 62/626,565, filed on Feb. 5, 2018.

(51) Int. Cl.
*G06F 12/0806* (2016.01)
*G06F 3/06* (2006.01)

(52) U.S. Cl.
CPC ........ *G06F 12/0806* (2013.01); *G06F 3/0608* (2013.01); *G06F 3/0659* (2013.01); *G06F 3/0673* (2013.01); *G06F 2212/62* (2013.01)

(58) Field of Classification Search
CPC ......... G06F 1/3212; G06F 11/14–1497; G06F 2211/1071
See application file for complete search history.

(56) References Cited

U.S. PATENT DOCUMENTS

| | | | |
|---|---|---|---|
| 7,809,886 B2 | 10/2010 | Ashmore et al. | |
| 8,325,554 B2 | 12/2012 | Sweere et al. | |
| 9,043,642 B2 | 5/2015 | Chon et al. | |
| 9,563,554 B2 | 2/2017 | Hulbert | |
| 2006/0242458 A1* | 10/2006 | Feldman | G06F 11/1441 714/14 |
| 2009/0083483 A1 | 3/2009 | Balakrishnan et al. | |
| 2012/0159239 A1 | 6/2012 | Chon et al. | |
| 2015/0095578 A1 | 4/2015 | Doshi et al. | |

(Continued)

OTHER PUBLICATIONS

Rudoff, Andy M., "Deprecating the PCOMMIT Instruction," https://software.intel.com/en-us/blogs/2016/09/12/deprecate-pcommit-instruction, 9 pages, Updated Sep. 12, 2016.

(Continued)

*Primary Examiner* — Nicholas J Simonetti
(74) *Attorney, Agent, or Firm* — Greenberg Traurig (57) ABSTRACT

A computing system having a power loss detector and memory components to store data associated with write commands received from a host system. The write commands are flushed from a protected write queue of the host system responsive to detecting an impending loss of power. The computing system further includes a processing device to receive the write commands over a memory interface. The processing device is further to, responsive to detecting the loss of power by the detector: disable the memory interface, and store the data associated with write commands that are received prior to disabling the memory interface. The data is stored in one or more of the memory components using power supplied by one or more capacitors.

20 Claims, 5 Drawing Sheets

(56) References Cited

U.S. PATENT DOCUMENTS

| | | |
|---|---|---|
| 2016/0188414 A1 | 6/2016 | Jayakumar et al. |
| 2016/0246723 A1 | 8/2016 | Doshi et al. |
| 2016/0378344 A1* | 12/2016 | Nachimuthu ......... G06F 9/4403 711/103 |
| 2016/0378467 A1* | 12/2016 | Doshi ................... G06F 9/3016 712/208 |
| 2016/0378623 A1 | 12/2016 | Kumar et al. |
| 2017/0052791 A1 | 2/2017 | Jenne et al. |
| 2017/0168890 A1 | 6/2017 | Marripudi et al. |
| 2018/0046556 A1* | 2/2018 | Marathe ................. G06F 11/14 |

OTHER PUBLICATIONS

International Search Report and Written Opinion, PCT/US2019/015361, dated May 1, 2019.

\* cited by examiner

FIG. 5

CPU CACHE FLUSHING TO PERSISTENT MEMORY

RELATED APPLICATIONS

This application claims priority to U.S. Provisional Application Ser. No. 62/626,565, filed Feb. 5, 2018, entitled "CPU Cache Flushing to Persistent Memory with Reduced Instructions," by Stonelake et al., the entire contents of which application is incorporated by reference as if fully set forth herein.

FIELD OF THE TECHNOLOGY

At least some embodiments disclosed herein relate to memory systems in general, and more particularly, but not limited to CPU cache flushing to persistent memory in computing systems.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of device in the computer; and the operating system uses the device driver to offer resources and/or services provided by the type of device. A central processing unit (CPU) of a computer system can run an operating system and device drivers to provide the services and/or resources to application programs. The central processing unit (CPU) can run an application program that uses the services and/or resources. For example, an application program implementing a type of application of computer systems can instruct the central processing unit (CPU) to store data in the memory components of a memory sub-system and retrieve data from the memory components.

A host system can be attached to a memory sub-system using interconnect. For example, one type of interconnect is described by the Cache Coherent Interconnect for Accelerators (CCIX) standard, which was created to enable hardware accelerators and processors to maintain cache coherency across shared memory in a heterogeneous multi-processor system. The CCIX interface standard specification enables coherent interconnect technologies between general-purpose processors and acceleration devices for heterogeneous computing. CCIX is intended to enable interconnect focused on acceleration applications such as machine learning, network processing, storage off-load, in-memory database, and 4G/5G wireless technology.

The CCIX standard allows processors based on different instruction set architectures to extend the benefits of cache coherent, peer processing to a number of acceleration devices including, for example, FPGAs, GPUs, network/storage adapters, intelligent networks, and custom ASICs. CCIX is intended to extend existing data center hardware and software infrastructure.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to CPU cache flushing to persistent memory in a computer system having one or more memory sub-systems. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

In some cases, for computing systems intended to use persistent memory technologies, such as certain DIMMs, new instructions have been defined to enable a persistent memory programming model. These new instructions include cache flushing instructions that flush lines from the CPU caches (e.g., CLWB and CLFLUSHOPT). Examples of such new instructions are described in the Intel Architecture Instruction Set Extensions Programming Reference, which relates to various platforms, including those supporting Intel DIMMs. The instructions provide a method to flush stores from a CPU cache to a persistence domain (that portion of a platform's data path where stores are power-fail safe).

These new instructions include one called PCOMMIT, intended for use on platforms where flushing from the CPU cache is not sufficient to reach the persistence domain. For example, the PCOMMIT instruction allows an application to flush-on-demand the write pending queues of a memory sub-system. On those platforms, an additional step using PCOMMIT is required to ensure that stores have passed from memory controller write pending queues of a host system to the DIMM, which is the persistence domain on those platforms. Thus, the use of the PCOMMIT instruction results in a more complex programming model in which an application contains logic for detecting whether the PCOMMIT instruction is required. For example, an instruction sequence for storing values to persistent memory locations is more complex.

In one case, a store moves data along a data path (MOV) to persistent memory. When an application executes a MOV instruction, the store typically ends up in the CPU caches. Instructions like CLWB can be used to flush the store from the CPU cache. At that point, the store may spend some amount of time in the write pending queue (WPQ) in the memory controller. A power-fail safe persistence domain may exist on a platform that is designed to flush the WPQ automatically on power-fail or shutdown. One such platform-level feature to perform this flushing is called asynchronous DRAM refresh (ADR).

At least some aspects of the present disclosure address the above and other deficiencies by using a backup component that stores data associated with write commands flushed from a CPU cache. The data is stored in non-volatile memory (e.g., persistent memory such as cross point memory). In one example, the cross point memory is 3DXP memory. The backup component eliminates the use of the PCOMMIT or similar instructions (e.g., an MCOMMIT instruction) by providing sufficient holdup in a computing system power supply to flush any remaining write commands from the protected write queue of the memory controller. For example, an instruction sequence for storing values to persistent memory locations is simpler without the PCOMMIT or similar instruction.

More specifically, in various embodiments, the backup component ensures that when there is a power loss event in the computing system, that the data associated with flushed write commands is stored by a memory system using one or more capacitors that provide power after detecting the power loss. In one example, the flushed write commands are received over a CCIX interconnect.

For example, when using the backup component according to various embodiments herein, a software application does not have to be modified to support a PCOMMIT, MCOMMIT, or similar instruction. Instead, the software application and/or computing system can ensure that CPU caches are flushed when the software is using memory regions that are cached. In one example, asynchronous DRAM refresh is implemented in a computing system to ensure that CPU caches are flushed. By using the backup component, the memory system has sufficient holdup power to store data associated with the flushed write commands. In one example, a power supply signals other system components that power-fail is imminent, which causes write pending queues in a memory system to be flushed.

In one example, a computing system flushes a write pending queue. For example, this can be a kernel-only facility used to flush commands written to DIMM command registers, or used by the kernel in the case where it wants to ensure a store is immediately flushed to the DIMM. In some cases, an application is unaware that this flush mechanism is being used. By using the backup component, sufficient holdup power is provided to store the data associated with write commands flushed from the write pending queue.

Figure 1:
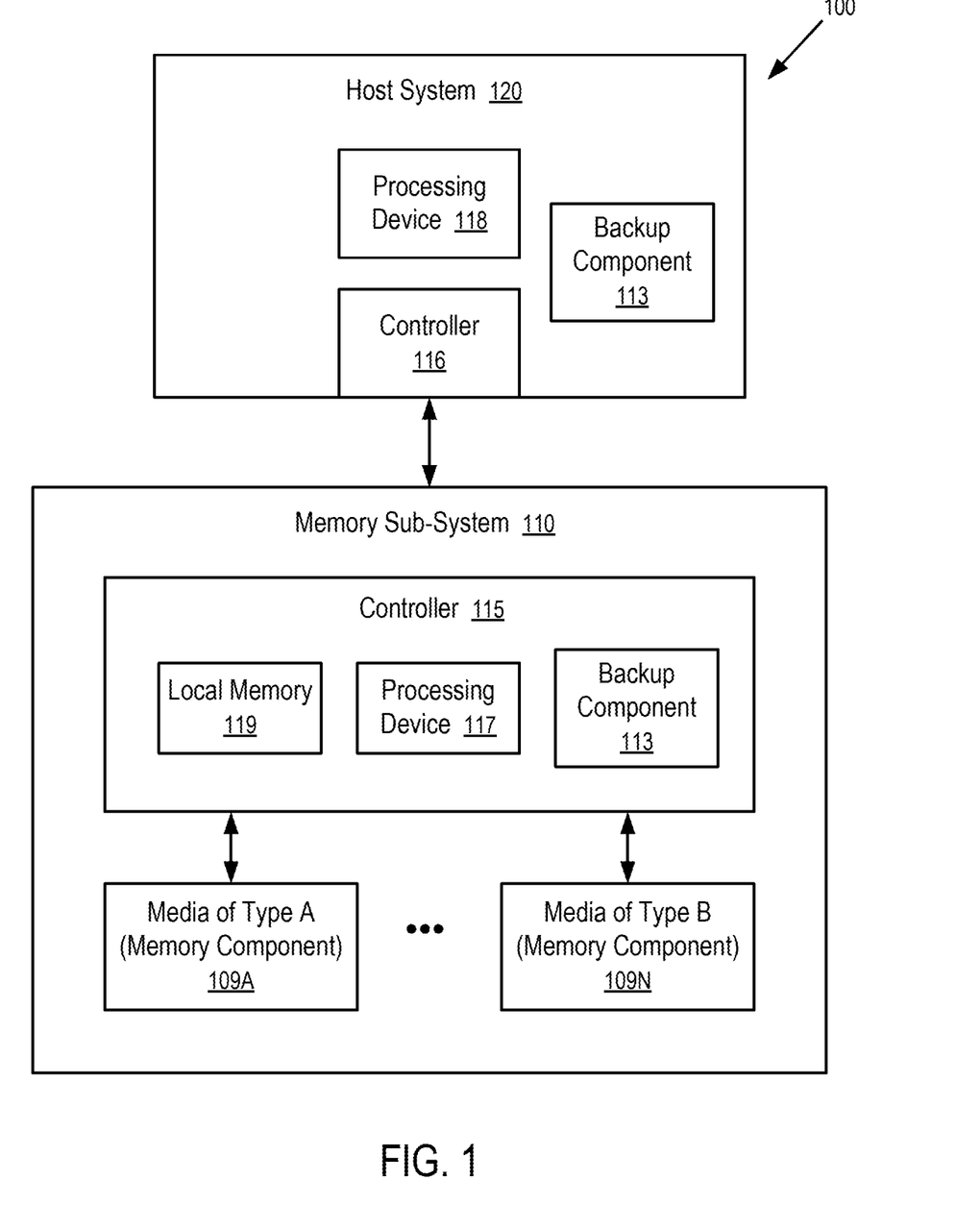
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM or SRAM) and address circuitry (e.g., a row decoder and a column decoder) that can receive an address from the controller 115 and decode the address to access the memory components 109A to 109N.

The computing system 100 includes a backup component 113 in the memory sub-system 110 to handle storage of data associated with write commands flushed from at least one cache of host system 120. In one embodiment, a portion of the backup component 113 is provided by host system 120. In this embodiment, backup component 113 at host system 120 receives a power fail signal (not shown in FIG. 1) (see, e.g., FIG. 2) from one or more power sources that indicates that a power fail from one of the power sources is imminent. The backup component 113 is used to avoid data loss on protected write queues until the data has been stored (e.g., by writing to persistent memory).

In one example, the cache is a protected write queue in controller 116. The memory sub-system 110 can generally communicate with host system 120 to store data in a storage media (e.g., 3DXP) via, for example, a CCIX interconnect or another memory interface that receives data from host system 120. In one example, the stored data is associated with write commands that are flushed in response to a power loss event that has been detected. In one embodiment, the flushed data is stored in 3DXP memory of memory sub-system 110 (e.g., a DIMM).

In various embodiments, computing system 100 can run software (e.g., software running in a CPU of host system 120) that includes instructions to flush data from a CPU cache when a signal is received indicating an impending power supply loss. The software according to the present embodiments uses a reduced number of instructions for performing the flushing of the CPU cache as compared to prior approaches. More specifically, in one embodiment, the MCOMMIT instruction is eliminated and is not required by the software (e.g., an application software) for flushing the data from the CPU cache. In one embodiment, the computing system 100 includes two or more CPUs, and each CPU may include two or more caches to be flushed.

In one embodiment, the computing system 100 implements an asynchronous DRAM refresh (ADR) sequence in response to detecting the power loss. In some embodiments, the computing system 100 can include both NVDIMM and persistent memory, and ADR is applied to protect data intended for storage in both the NVDIMM and the persistent memory. In one example, ADR is used to signal other system components that power-fail is imminent, causing the write pending queues of controller 116 to be flushed and sent over an interface to memory sub-system 110.

In various examples, when flushing data from the CPU cache, the data is written to persistent memory (e.g., cross point memory component 109A). In some examples, the persistent memory is attached to the CPU using a CCIX interface. In some examples, the persistent memory is 3DXP memory. In other embodiments, a different memory interface can be used, and/or various other types of storage class memory can be used as the persistent memory.

In some embodiments, the controller 115 and/or the processing device 117 in the memory sub-system 110 includes at least a portion of the backup component 113. For example, the controller 115 and/or the processing device 117 can include logic circuitry implementing the backup component 113. For example, the processing device 117 (processor) of the memory sub-system 110 can be configured to execute instructions stored in memory for performing operations to store data for the backup component 113 as described herein. In other embodiments, at least a portion of the backup component 113 is part of an operating system of the host system 120, a device driver, or an application. In one example, a central processing unit (CPU) can store data in a memory system connected to the CPU. For example, the central processing unit (CPU) can be configured to store the data using backup component 113.

Figure 2:
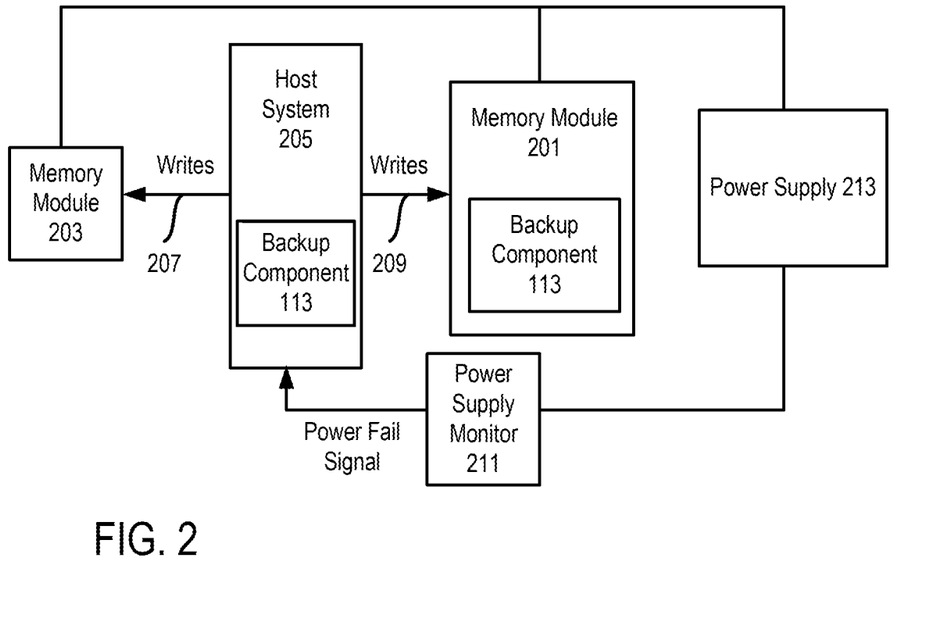
FIG. 2 shows a computing system that stores data associated with write commands received from a host system in accordance with some embodiments of the present disclosure.

FIG. 2 shows a computing system that stores data associated with write commands received by memory modules 201 and 203 from a host system 205 in accordance with some embodiments of the present disclosure. Host system 205 is an example of host system 120 and can include at least a portion of backup component 113. Memory modules 201 and 203 are each an example of memory sub-system 110.

Host system 205 sends write commands to memory module 201 over memory interface 209, and sends write commands to memory module 203 over memory interface 207. In various embodiments, memory module 201 stores data in non-volatile memory using backup component 113. In one example, memory module 201 stores data in 3DXP memory. Memory interface 209 is, for example, a CCIX interconnect.

In one embodiment, memory module 203 stores data in non-volatile memory. In one example, memory module 203 is an NVDIMM. Memory interface 207 is, for example, a DDR bus.

A power supply 213 provides power during normal operation to memory module 201 and memory module 203. A power supply monitor 211 monitors power supply 213 during operation of the computing system. Power supply monitor 211 detects an impending loss of power provided from power supply 213. In response to detecting the impending loss of power, power supply monitor 211 provides a power fail signal to host system 205. In various embodiments, host system 205 implements an asynchronous DRAM refresh (ADR) sequence in response to receiving the power fail signal.

In various embodiments, write commands are flushed from one or more protected write queues for memory controllers of host system 205. For example, a memory controller of host system 205 (e.g., controller 116) communicating with memory module 201 flushes write commands from its protected write queue. These flushed write commands are sent to memory module 201 over memory interface 209.

In one example, another memory controller of host system 205 communicating with memory module 203 flushes write commands from its protected write queue. These flushed write commands are sent to memory module 203 over memory interface 207.

According to various embodiments, backup component 113 detects a loss of power provided from power supply 213 to memory module 201. Responsive to detecting the loss of power provided to memory module 201, memory interface 209 is disabled. For example, no further read or write operations are performed over memory interface 209.

In addition, responsive to detecting the loss of power, data corresponding to write commands flushed from the protected write queue of host system 205, and received prior to disabling the memory interface 209, are stored in one or more memory components of memory module 201. In various embodiments, backup component 113 uses power supplied by one or more capacitors to hold power until data is stored in a non-volatile memory on memory module 201. In one example, the capacitors are internal to memory module 201. In one example, the one or more capacitors are part of a holdup capacitor bank of memory module 201.

In one embodiment, a detector of memory module 201 detects a loss of power when a supply voltage obtained from power supply 213 falls below a predetermined threshold. In one embodiment, responsive to detecting the loss of power, backup component 113 writes a log associated with this power fail handling.

In one example, a power fail threshold at which a power loss is detected is set at 10.5 V. In one example, the one or more capacitors provide at least 10 ms of holdup time. In one example, storing of the data in the one or more memory components of memory module 201 is completed less than 20 ms after the host system 205 receives the power fail signal from power supply monitor 211.

In one example, a motherboard (not shown) includes multiple CPUs attached to NVDIMMs (e.g., memory module 203) and persistent memory (e.g., one or more memory components in memory module 201). The persistent memory is connected into the system through a CCIX interface. For example, each CPU has a memory controller to the NVDIMMs and a CCIX interface to the persistent memory. In one example, the memory controller is a standard DDR controller.

In one example, any writes received by the persistent memory on the CCIX interface are persistent. Software running in the CPU ensures that the data is written persistently to the persistent memory, and that any data stores are persistent.

In one example, the computing system includes voltage regulators (not shown) and an FPGA that acts as power supply monitor 211. In another example, the FPGA (or alternatively, CPLD or discrete logic) filters digital "Power OK" signals from one or more power supplies. In this example, the power supply includes a power monitor that deasserts a "Power OK" signal before the supply's storage capacitors have been depleted. In another example, a more complex circuit is implemented on a motherboard with comparators that monitor the power supply voltage(s) directly, and there is additional capacitance on the motherboard to ensure there is enough holdup time after a power loss is detected, which extends the backup time.

The computing system gets power from, for example, an AC power supply that can be rack level or can be in the same unit as a server (e.g., 12-volt power, and 12-volt rail regulators). In one example, the persistent memory itself runs on 12 volts, which may be passed in un-adulterated by regulators on the motherboard.

The voltage regulators regulate down to the voltages that are used by the FPGA and NVDIMMs and CPU(s), and include, for example, multiple voltage rails. In one example, the FPGA is a platform monitoring device that monitors the power supply 213. The FPGA can trigger one or more signals to the CPU(s), for example, if the FPGA detects that a power failing state exists (e.g., that there is an impending power failure).

In one example, detection of a loss of power triggers a signal to the CPUs (e.g., a force self refresh or power fail signal). The signal provides a certain amount of warning ahead of power (e.g., 12 volts) actually dropping. So, the system has, for example, a millisecond of time or less as the current power supply capability to supply energy will be ending.

Figure 3:
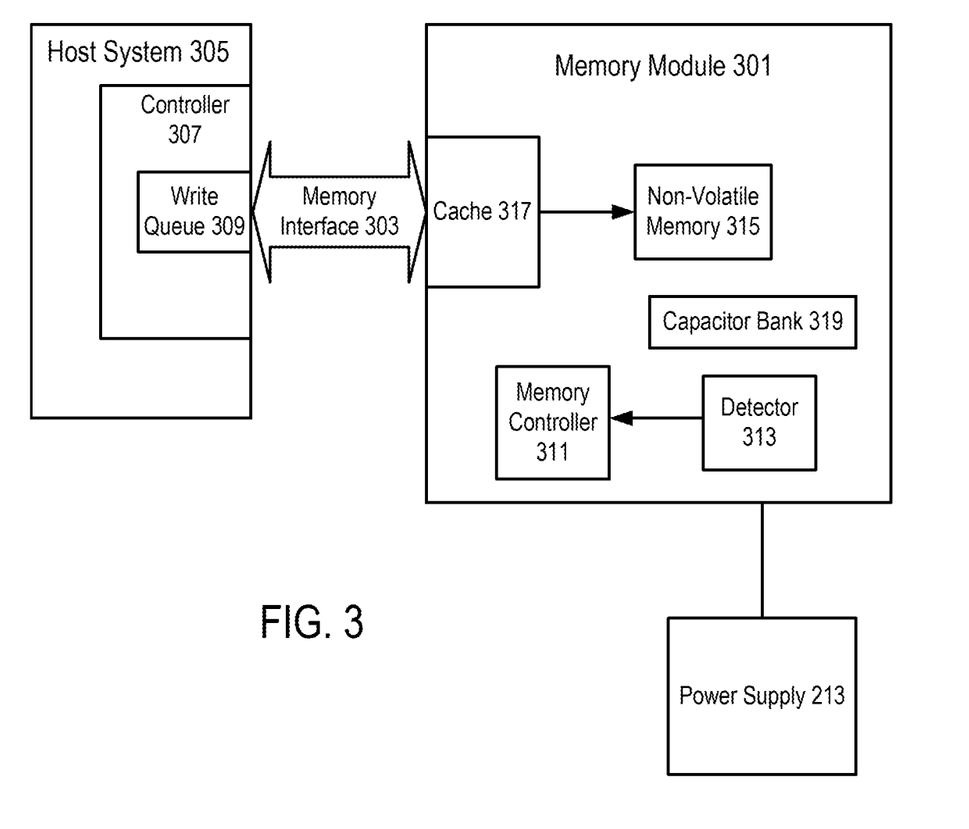
FIG. 3 shows a memory module to store data associated with write commands received from a write queue of a host system in accordance with some embodiments of the present disclosure.

In one example, a power fail signal provided by the FPGA causes the CPUs to save protected write buffers (e.g., write queue 309) to persistent memory and/or DRAM in the NVDIMM(s) as part of an ADR sequence. In one example, the system has triggered the warning, or interrupted the CPUs. Each CPU gets the signal or message, and the CPUs write from protected write buffers (e.g., any writes that exist outside of the CPU cache currently). The CPU cache has been flushed by the software, but those writes may still be in intermediate queues on the way to either the DIMM for the NVDIMMs or to the CCIX interconnect for persistent memory. The signal forces the CPUs to flush the protected write buffers. The signal provides sufficient time for the CPUs to ensure that those writes are pushed out.

In one example, the CPUs on the motherboard assert a save signal after writes in memory controller queues have been pushed to DRAM of the NVDIMMs. In one example, the CPU receives a signal that instructs the NVDIMMs to back up data in their DRAM to persistent storage.

In one example, as between the CPU and the persistent memory, the writes that were in the CPU have been pushed out to the persistent memory. At that point, the persistent memory ensures that as long as those writes have been completed to the host, the persistent memory controller will persist those writes through to store them. At this point, power can be safely removed (e.g., twelve volts can drop below the limit for the persistent memory, and the persistent memory will protect those writes).

In one example, a software application does not need to issue MCOMMIT instructions to get data corresponding to stores out of the CPU to persistent memory. For example, no other data has to go from the CPU on the CCIX link to the persistent memory. The system can use the ADR feature to flush out those last writes. In various embodiments, this can save a processing step.

FIG. 3 shows a memory module 301 to store data associated with write commands received from a write queue 309 of a host system 305 in accordance with some embodiments of the present disclosure. Host system 305 is an example of host system 120 or 205, and memory module 301 is an example of memory module 201. Memory module 301 receives power provided from power supply 213.

Host system 305 includes a controller 307 having write queue 309. Controller 307 is an example of controller 116. Memory module 301 communicates with controller 307 over a memory interface 303. In one example, memory interface 303 is a CCIX interconnect. Write queue 309 is a protected write queue including write commands that are flushed responsive to, for example, a power fail signal provided to host system 305 by power supply monitor 211 (shown in FIG. 2).

Memory module 301 includes a cache 317 to receive write commands over the memory interface 303 from the host system 305. Memory module 301 further includes a detector 313 to detect a loss of power provided from the power supply 213. When a loss of power is detected, detector 313 provides a signal to a memory controller 311. Memory controller 311 is an example of controller 115.

In response to receiving the signal from detector 313 indicating detection of the loss of power, memory controller 311 causes memory module 301 to disable memory interface 303 and store data associated with write commands received by cache 317 over the memory interface 303. In various embodiments, the write commands have been flushed from the write queue 309 in response to a signal (e.g., the power fail signal of FIG. 2) provided to host system 305 indicating an impending loss of power from power supply 213.

Memory module 301 includes a capacitor bank 319 having one or more capacitors. Capacitor bank 319 supplies power for the storing of data by memory module 301 after the loss of power is detected by detector 313. The storing of data includes writing the data from cache 317 to non-volatile memory 315. In one example, non-volatile memory 315 is cross point memory (e.g., 3DXP memory).

In one example, the host system 305 uses ADR for power loss protection. The host system 305 ensures that all stores to be persisted are in write queue 309 prior to retiring the last store fence instruction (e.g., SFENCE). For example, the host system 305 ensures that before the next SFENCE instruction, the stored data associated with the previous SFENCE instruction is flushed to the write queue 309. In one example, when there is a power loss event, power is held up for a sufficient time so that data is flushed from write queue 309 and into cache 317. In one example, the memory interface 303 is CCIX interconnect. As a result, an MCOM-MIT instruction before the next SFENCE instruction is not required. Instead, the host system 305 and memory module 301 work together to ensure that the result of store instructions between SFENCE instructions will be committed.

Figure 4:
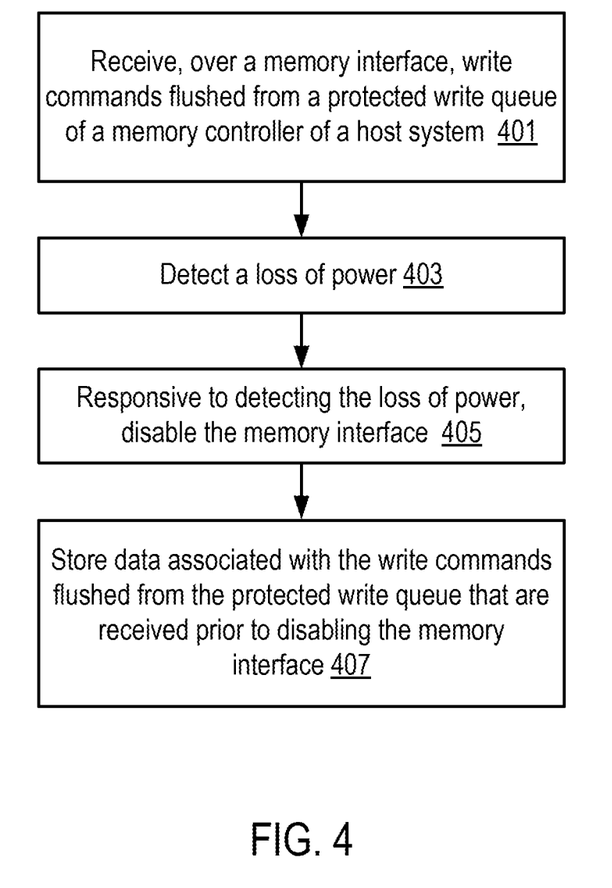
FIG. 4 shows a method for CPU cache flushing to persistent memory in accordance with some embodiments of the present disclosure.

FIG. 4 shows a method for CPU cache flushing to persistent memory in accordance with some embodiments of the present disclosure. The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 4 is performed at least in part by the backup component 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 4 can be implemented in a computing system of FIG. 1 or 2 with host system 120 and memory sub-system 110 or memory module 201. In one example, the backup component 113 can be implemented at least in part via the memory module 301 of FIG. 3 and the host system 305 of FIG. 3.

At block 401 in FIG. 4, write commands are received over a memory interface. The write commands are flushed from a protected write queue of a memory controller of a host system. In one example, the write commands are received by memory module 301 over memory interface 303 from controller 307. In one example, the protected write queue is write queue 309, and the write commands are received by cache 317.

At block 403, a loss of power is detected. In one example, the loss of power is detected by detector 313 of memory module 301.

At block 405, responsive to detecting loss of power, the memory interface is disabled. In one example, detector 313 provides a signal to memory controller 311 indicating detection of the loss of power. In one example, the memory interface 303 is disabled.

At block 407, data associated with the write commands flushed from the protected write queue that are received prior to disabling the memory interface are stored. In one example, memory controller 311 causes disabling of memory interface 303 in response to receiving the signal from detector 313. In one example, the data is stored in non-volatile memory 315 of memory module 301. In one example, the backup component 113 of memory module 201 provides power until data has been stored in non-volatile memory of the memory module 201.

In one embodiment, a computing system (e.g., memory module 301) includes: a detector (e.g., detector 313) to detect a loss of power provided from a power supply (e.g., power supply 213); at least one capacitor (e.g., capacitor bank 319) to provide power for storing data after the loss of power; and one or more memory components (e.g., non-volatile memory 315) to store data associated with write commands received from a host system (e.g., host system 305). The write commands are flushed from a protected write queue (e.g., write queue 309) of a memory controller (e.g., controller 307) of the host system responsive to a signal provided to the host system by a power supply monitor (e.g., power supply monitor 211), and the power supply monitor provides the signal responsive to detecting an impending loss of power from the power supply.

The computing system further includes a cache (e.g., cache 317) to receive, over a memory interface (e.g., interface 303), write commands from the host system; and a processing device (e.g., controller 311), operatively coupled with the memory components, to: receive, by the cache over the memory interface, the write commands flushed from the protected write queue. The processing device is further to, responsive to detecting, by the detector, the loss of power: disable the memory interface, and store data corresponding to write commands flushed from the protected write queue that are received by the cache prior to disabling the memory interface. The data is stored in at least one of the memory components using power supplied by the at least one capacitor.

In one embodiment, the write commands in the protected write queue correspond to stores to be persisted by the host system (e.g., host system 305), and software executing on the host system moves the write commands to the protected write queue prior to retiring the stores. In one embodiment, the software ensures that stores prior to a store fence instruction are globally visible in the host system before any store after the store fence instruction becomes globally visible in the host system.

In one embodiment, the write commands are moved to the protected write queue from at least one cache of a processing device of the host system.

In one embodiment, the at least one capacitor provides at least 10 ms of holdup time.

In one embodiment, the detector detects the loss of power when a supply voltage obtained from the power supply falls below a predetermined threshold.

In one embodiment, the write commands in the protected write queue correspond to write operations committed to the memory controller by a processing device of the host system.

In one embodiment, the write operations are committed to the memory controller by software executing on the host system, and the write commands are flushed based on an instruction provided by the software responsive to the signal provided to the host system by the power supply monitor.

In one embodiment, the data is stored in at least one of the memory components less than 20 ms after the host system receives the signal from the power supply monitor.

In one embodiment, the processing device is further to, responsive to detecting by the detector the loss of power, write a log associated with power fail handling. In one example, the log includes a starting time, an ending time, and/or a time duration for power fail handling.

In one embodiment, the cache (e.g., cache 317) comprises static random access memory (SRAM), and the data is stored in non-volatile memory.

In one embodiment, the write commands are flushed from the protected write queue during an asynchronous memory refresh sequence (e.g., an ADR sequence).

In one embodiment, a method includes: receiving, by a cache over a memory interface, write commands flushed from a protected write queue of a memory controller of a host system; detecting, by a detector, a loss of power; and responsive to detecting the loss of power: disabling the memory interface, and storing data associated with the write commands flushed from the protected write queue that are received by the cache prior to disabling the memory interface. The data is stored in at least memory component using power supplied by at least one capacitor.

In one embodiment, the write commands are flushed from the protected write queue responsive to a signal provided to the host system by a power supply monitor, and the power supply monitor provides the signal responsive to detecting an impending loss of power provided by a power supply.

In one embodiment, the write commands in the protected write queue correspond to stores to be persisted by the host system, and software executing on the host system moves the write commands to the protected write queue prior to retiring the stores.

In one embodiment, the write commands are moved to the protected write queue from at least one cache of a processing device of the host system.

In one embodiment, the write commands are flushed from the protected write queue during an asynchronous memory refresh sequence.

In one embodiment, the method further includes, responsive to detecting the loss of power, writing a log associated with storing the data. In one embodiment, the log includes a starting time for power fail handling.

In one embodiment, a non-transitory computer storage medium stores instructions which, when executed by a memory module having a detector, at least one capacitor, and one or more memory components, cause the memory module to perform a method, the method including: receiving, over a memory interface, write commands from a protected write queue of a host system; detecting, by the detector, a loss of power; and responsive to detecting the loss of power: disabling the memory interface, and storing data associated with write commands received from the protected write queue. The data is stored in non-volatile memory using power supplied by the at least one capacitor.

In one example, a persistent memory model is used which eliminates the MCOMMIT instruction. The computing system provides sufficient holdup in the system power supply (enough warning from the system power supply) to flush the last writes out of a CPU cache (the writes are on the way to the CCIX interconnect), and this can be implemented with asynchronous DRAM refresh (ADR). Then, software does not need to be modified to support the MCOMMIT instruction (e.g., the MCOMMIT instruction can be eliminated and the software does not have to be re-compiled). The software only needs to ensure that the CPU cache is flushed (e.g., when the software is using memory regions that can be cached).

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3DXP memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller of a memory sub-system can run firmware to perform operations responsive to the communications from a processing device. Firmware in general is a type of computer program that provides control, monitoring and data manipulation of engineered computing devices.

Some embodiments involving the operation of the controller can be implemented using computer instructions executed by the controller, such as the firmware of the controller. In some instances, hardware circuits can be used to implement at least some of the functions. The firmware can be initially stored in the non-volatile storage media, or another non-volatile device, and loaded into volatile DRAM and/or an in-processor cache memory for execution by the controller.

A non-transitory computer storage medium can be used to store instructions of the firmware of a memory sub-system and/or the instructions of the operating system in general. In one example, when the instructions are executed by a processing device, the instructions cause the processing device to perform a method discussed above.

Figure 5:
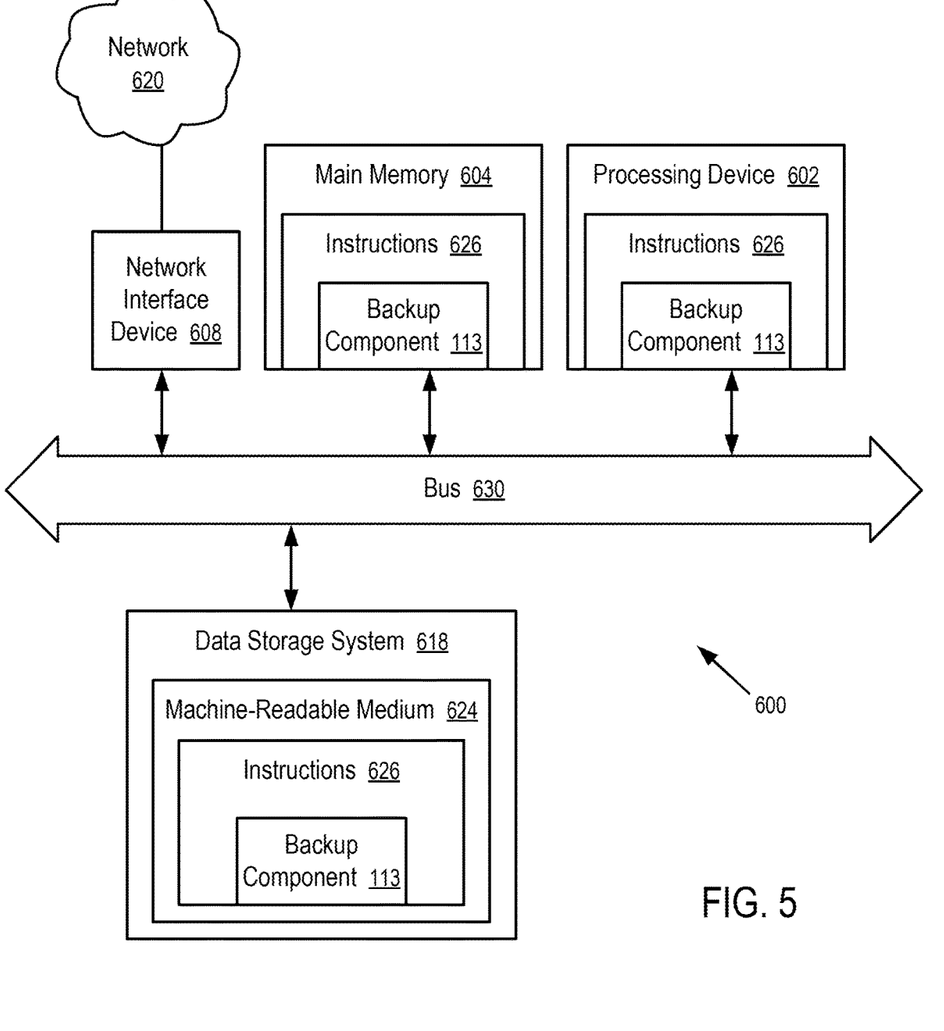
FIG. 5 is a block diagram of an example computer system in which embodiments of the present disclosure can operate.

FIG. 5 is a block diagram of an example computer system 600 in which embodiments of the present disclosure can operate. FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a backup component 113 (e.g., to execute instructions to perform operations corresponding to the backup component 113 described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a backup component 113 (e.g., the backup component 113 described with reference to FIGS. 1-4). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a detector of a memory module, the detector configured to detect a loss of power provided from a power supply;
at least one capacitor of the memory module, the at least one capacitor configured to provide power for storing data after the loss of power;
a plurality of memory components of the memory module, the memory components configured to store data associated with write commands received from a host system, wherein the write commands are flushed from a protected write queue of a memory controller of the host system responsive to a signal provided to the host system by a power supply monitor, and wherein the power supply monitor is configured to provide the signal responsive to detecting an impending loss of power from the power supply;
a cache of the memory module, the cache configured to receive, over a memory interface from the host system, the write commands flushed from the protected write queue; and
a controller of the memory module, the controller configured to, responsive to detecting, by the detector, the loss of power:
disable the memory interface, and
store data corresponding to the write commands flushed from the protected write queue that are received by the cache prior to disabling the memory interface, wherein the data is stored in at least one of the plurality of memory components using power supplied by the at least one capacitor.

2. The system of claim 1, wherein the write commands in the protected write queue correspond to stores to be persisted by the host system, and wherein software executing on the host system moves the write commands to the protected write queue prior to retiring the stores.

3. The system of claim 2, wherein the software ensures that the stores prior to a store fence instruction are globally visible in the host system before any store after the store fence instruction becomes globally visible in the host system.

4. The system of claim 1, wherein the write commands are moved to the protected write queue from at least one cache of a processing device of the host system.

5. The system of claim 1, wherein the at least one capacitor provides at least 10 ms of holdup time.

6. The system of claim 1, wherein the detector detects the loss of power when a supply voltage obtained from the power supply falls below a predetermined threshold.

7. The system of claim 1, wherein the write commands in the protected write queue correspond to write operations committed to the memory controller by a processing device of the host system.

8. The system of claim 7, wherein the write operations are committed to the memory controller by software executing on the host system, and the write commands are flushed based on an instruction provided by the software responsive to the signal provided to the host system by the power supply monitor.

9. The system of claim 1, wherein the data is stored in the at least one of the plurality of memory components less than 20 ms after the host system receives the signal from the power supply monitor.

10. The system of claim 1, wherein the controller is further configured to, responsive to detecting by the detector the loss of power, write a log associated with power fail handling.

11. The system of claim 1, wherein the cache comprises static random access memory, and the data is stored in non-volatile memory.

12. The system of claim 1, wherein the power supply monitor is external to the host system, and the write commands are flushed from the protected write queue during an asynchronous memory refresh sequence.

13. A method, comprising:
receiving, by a cache of a memory module coupled to a host system by a memory interface, write commands flushed from a protected write queue of a memory controller of the host system, wherein the write commands are flushed from the protected write queue responsive to a signal provided to the host system by a power supply monitor, and wherein the power supply monitor provides the signal responsive to detecting an impending loss of power provided by a power supply;
detecting, by a detector of the memory module, a loss of power; and
responsive to detecting the loss of power:
disabling the memory interface, and
storing data associated with the write commands flushed from the protected write queue that are received by the cache prior to disabling the memory interface, wherein the data is stored in at least one of a plurality of memory components of the memory module using power supplied by at least one capacitor of the memory module.

14. The method of claim 13, wherein the power supply monitor is external to the memory module.

15. The method of claim 13, wherein the write commands in the protected write queue correspond to stores to be persisted by the host system, and wherein software executing on the host system moves the write commands to the protected write queue prior to retiring the stores.

16. The method of claim 13, wherein the write commands are moved to the protected write queue from at least one cache of a processing device of the host system.

17. The method of claim 13, wherein the write commands are flushed from the protected write queue during an asynchronous memory refresh sequence.

18. The method of claim 13, further comprising, responsive to detecting the loss of power, writing a log associated with storing the data.

19. The method of claim 18, wherein the log includes a starting time for power fail handling.

20. A non-transitory computer storage medium storing instructions which, when executed by a memory module having a detector, at least one capacitor, and a plurality of memory components, cause the memory module to perform a method, the method comprising:
receiving, over a memory interface, write commands from a write queue of a host system, wherein the write commands are flushed from the write queue responsive to a signal provided to the host system by a power supply monitor, and the power supply monitor provides the signal responsive to detecting an impending loss of power to the host system;

detecting, by the detector, a loss of power to the memory module; and
responsive to detecting the loss of power:
   disabling the memory interface, and
   storing data associated with the write commands received from the write queue, wherein the data is stored in non-volatile memory using power supplied by the at least one capacitor.

\* \* \* \* \*